Jan. 29, 1957 R. C. MINNICK 2,779,934

SWITCHING CIRCUITS

Filed June 24, 1953

INVENTOR
R. C. MINNICK
BY Jameson D. Falk
ATTORNEY

United States Patent Office 2,779,934

Patented Jan. 29, 1957

2,779,934

SWITCHING CIRCUITS

Robert C. Minnick, Cambridge, Mass., assignor to Bell Telephone Laboratories, Incorporated, New York, N. Y., a corporation of New York Application June 24, 1953, Serial No. 363,832

12 Claims. (Cl. 340—174)

Figure 1:
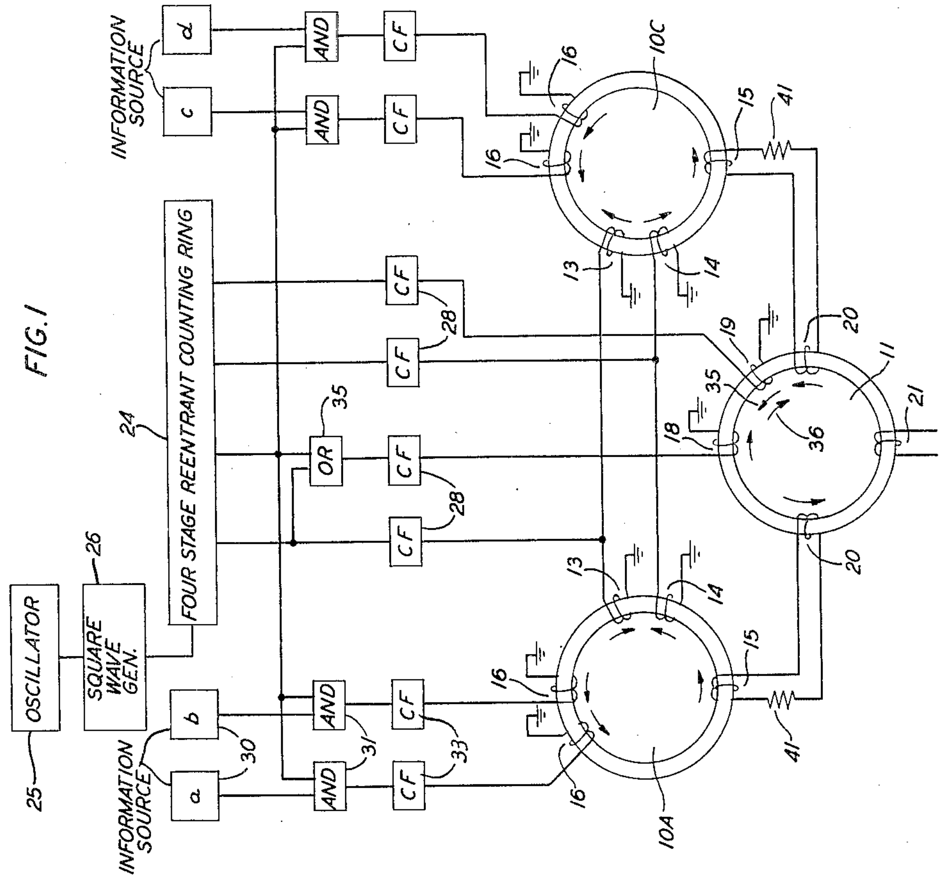

This invention relates to switching circuits and more particularly to such circuits utilizing magnetic cores.

In electric circuits and systems, there are many cases where it is necessary to have a two-valued output depending on the conditions of a number of two-valued inputs. This output is a switching function which term we may define as any binary function of any number of binary variables. The binary variables generally represent the presence or absence of a pulse, closed or open contacts, the truth or falsity of a condition, etc., and have become identified with the digits "1" and "0." As is known, any switching function of $n$ binary variables may be specified by specifying a set of binary coefficients, $f_i$, for $i=0, 1, \ldots, \nu-1$, where $\nu=2^n$, in the expression $$f=f_0x'_1x'_2 \ldots x'_{n-1}x'_n+f_1x'_1x'_2 \ldots x'_{n-1}x_n \ldots +f_{\nu-1}x_1x_2 \ldots x_{n-1}x_n \quad (1)$$

where the pattern of primes on the input variables corresponds to the binary expression for the subscript $i$ of the coefficient $f_i$ multiplying each term. As is general, the negation of a binary variable is indicated by a prime. Equation 1 is called a "canonical form" of a switching function of $n$ variables. A general discussion of switching functions and of the mathematics describing them to be employed hereinafter may be found in "Synthesis of Electronic Computing and Control Circuits" by the Staff of the Computation Laboratory of Harvard University (Harvard University Press, 1951).

The importance of the canonical form of the switching function given in Equation 1 can be seen by an example of a particular function employing only two variables $$f(x,y)=f_0x'y'+f_1x'y+f_2xy'+f_3xy \quad (2)$$

and a very simple illustration of a switching function in an electrical circuit. Equation 2 may be the expression for a binary adder in which two digits, $x$ and $y$, are to be summed. As is known, the switching function $f$ should be "1" only if $x$ or $y$ is "1," but not both. In the latter case, a different switching function should indicate a carry. But considering only summation without carry, the function $f$ is determined by the coefficients $f_0=f_3=0$ and $f_1=f_2=1$. Therefore the switching function $f$ is defined by Equation 2 when the coefficients have the values just stated.

The canonical form of a switching function, Equation 1, is only one of a number of canonical expressions. Equation 1 has been mentioned first because it most readily may be understood in terms of a simple example and in terms of physical circuits, as it represents any switching function as individual AND circuits combined in an OR circuit; an AND circuit, as is known, is a logic circuit in which an output appears only on the simultaneous occurrence of all inputs and an OR circuit a logic circuit where an output appears on the occurrence of a pulse at any input. As each variable is represented in each term of the canonical expression of Equation 1, the terms are mutually exclusive, i. e., only one term may be equal to "1" for a given set of values for $n$ input variables. If the specific values of the coefficients $f_i$ are known, it is desirable and possible to simplify this expression. For example, consider the general canonical form of Equation 1 for three variables $x_1$, $x_2$, and $x_3$:

$$f=f_0x'_1x'_2x'_3+f_1x'_1x'_2x_3+f_2x'_1x_2x'_3+f_3x'_1x_2x_3+f_4x_1x'_2x'_3+f_5x_1x'_2x_3+f_6x_1x_2x'_3+f_7x_1x_2x_3 \quad (3)$$

and the particular case in which $f_0=f_1=f_3=0$ and $f_2=f_4=f_5=f_6=f_7=1$. Equation 3 may then be written $$f=x'_1x_2x'_3+x_1x'_2x'_3+x_1x'_2x'_3+x_1x_2x'_3+x_1x_2x_3 \quad (4)$$

which can be shown, by theorems of Boolian algebra, to simplify to:

$$f=x_2x'_3+x_1 \quad (5)$$

These terms are now, however, not mutually exclusive. Equation 5 is a plausible form in one algebra that has come into general switching use, known as Boolian algebra (vide, e. g., chapter 5 of the "Design of Switching Circuits" by Keister, Ritchie, and Washburn, D. Van Nostrand Company, 1951) but is not plausible in terms of the switching algebra set forth in the above-mentioned "Synthesis of Electronic Computing and Control Circuits." It can be shown readily that in terms of the latter algebra Equation 5 becomes $$f=1-(1-x_2x'_3)(1-x_1) \quad (6)$$

and that the general canonical form is $$f=1-(1-f_0x'_1x'_2 \ldots x'_n)(1-f_1x'_1x'_2 \ldots x_n) \ldots (1-f_{\nu-1}x_1x_2 \ldots x_n) \quad (7)$$

This may again be considered as individual AND circuits combined in an OR circuit and corresponds to Equation 1, being the sum of products in Boolian algebra.

However, it is known that any switching function can be represented not only as individual AND circuits combined in an OR circuit, but also as individual OR circuits combined in an AND circuit. Another canonical form of the general switching function is therefore:

$$f=(1-f'_0x'_1x'_2 \ldots x'_n)(1-f'_1x'_1x'_2 \ldots x_n) \ldots (1-f'_{\nu-1}x_1x_2 \ldots x_n) \quad (8)$$

Equation 8 is different in form from Equation 1 being the product of sums in Boolian algebra, and given by the expression $$f=(x_1+x_2 \ldots +x_n+f_0)(x_1+x_2 \ldots +x'_n+f_1) \ldots (x'_1+x'_2 \ldots +x'_n+f_{\nu-1}) \quad (9)$$

A device capable of assuming two states may be employed in circuits designed for general or special switching functions. To be perfectly general, such a device should be capable of responding to $n$ binary variable inputs and should be capable of cooperating with $(\nu-1)$ other such devices. In one form each device individually identifies a coefficient $f_i$ and all the devices together identifying the switching function $f$. If these devices define logic circuits any general switching function may be defined. The logic circuits may be AND and OR circuits but just AND or OR circuits alone are insufficient to define all possible switching functions, though they may identify some.

One device that may assume either of two states and has therefore been used for binary memory or storage is a magnetic core. Such cores may be obtained with substantially rectangular hysteresis loops and may be of a ferrite material, such as the General Ceramics MF1118 Ferramic material, Deltamax, a grain-oriented 50 percent nickel-iron alloy of the Allegheny Ludlum Steel Corporation, 4–79 molybdenum Permalloy, supermalloy, or of other materials known in the art. In such a core, the ratio of retentivity to the saturation flux density is nearly unity. In the absence of an applied magnetic field, the core will have a remanent magnetization which will be positive or negative depending on the direction of the last magnetizing force. One state of remanent magnetization can be defined as corresponding to the binary state "0" and the other as corresponding to the binary state "1."

In storing information in such a magnetic core, a control winding is energized to apply a magnetic field to the core, placing the core in the condition defined as representing the storage of a binary "0." The binary information can then be stored by applying a current pulse to an input information winding if the informating is a binary "1" and no pulse if the information is a binary "0." To read out, a current pulse in the same sense as the initial pulse is applied to the control winding. If the core is in a state such that a binary "0" had been stored, the magnetization of the core is not reversed and only a slight output voltage appears on an output winding, due to a change in flux in the core. However, if the core is in a state such that a binary "1" had been stored, the magnetization of the core is reversed and a large ouptut pulse appears at the terminals of the output winding. Such cores used for storage are further described in an article "Static magnetic storage and delay line" by An Wang and Way Dong Woo in the Journal of Applied Physics, volume 21, page 49 (January 1950).

If more than one input information winding is employed, such cores may define OR circuits. However, as stated above OR circuits alone are insufficient to define the general switching function given, in canonical form, in Equation 1. Further, magnetic cores do not readily yield AND circuits.

In accordance with one aspect of this invention a type of magnetic core circuit is provided which, either alone or in conjunction with OR circuits, can give all possible switching functions; this circuit is a joint denial circuit. A joint denial circuit may be exemplified by the expression $$f=x'y' \qquad (10)$$

which states that an output is only present on the joint denial of $x$ and $y$. In general any desired switching function may be attained, either in the form of Equation 8 by joint denial circuits or in the form of Equation 7 by joint denial circuits and an OR circuit.

In the above description of the use of a magnetic core as a storage or memory device or as an OR circuit, a pulse was applied to a single control winding which both advanced the information, by reading it out, and reset the core. Thus in a static magnetic delay line, the control pulse both causes the information to be transferred to the next core and resets each core from which information has been transferred in preparation for the next bit of information to be stored. These two operations of transferring information out of a core and of resetting a core to its "0" state will be herein referred to as "advance" and "reset," respectively. In the prior magnetic storage device, these operations have been combined. However, in accordance with one aspect of this invention these operations are separated and the advance and reset pulses tend to magnetize the core to opposite states of remanent magnetization in which the residual or remanent flux is in opposite directions, whereby a joint denial circuit may be attained.

It is a general object of this invention to attain any desired switching function by a circuit employing only magnetic cores. As magnetic cores can be produced very cheaply, will have exceedingly long if not infinite life, and have low power requirements, it is thus an object of this invention to simplify switching circuits and to provide general switching circuits that are extremely economical and may also be very compact.

It is another object of this invention to provide joint denial circuits utilizing magnetic cores.

It is a further object of this invention to provide switching circuits utilizing joint denial magnetic cores to provide any desired switching function.

It is a still further object of this invention to provide switching circuits utilizing joint denial magnetic cores and to prevent erroneous output information due to the placing of input information into the switching circuit.

These and other objects of this invention are attained in one specific illustrative embodiment wherein a plurality of magnetic cores are arranged in a first level, each of the cores having a reset winding, information windings, an advance winding, and an output winding so arranged that an output pulse is generated on application of a pulse to the advance winding only on the joint denial of the input information at any first level core. A single second level core has a plurality of windings on it, the output winding of each first level core being connected to individual information windings on the second level core and reset and advance or read out pulses being applied to other of the windings. The second level core may be either a joint denial circuit or an OR circuit, depending on the polarity of the remanent magnetization on application of the read out pulse, and thus an output may be generated by the second level core either in the absence of any outputs from the first level cores or on the presence of an output from at least one first level core.

In accordance with one aspect of this invention, the timing of the pulses applied to first level cores and the second level core is such that erroneous information cannot be transferred between the first level cores and the second level core. Specifically in one specific illustrative embodiment of this invention, in the sequence of operation, the reset pulse is applied to the first level cores, followed by the information pulses, if any. Simultaneously a reset pulse is applied to the second level core, the second level reset pulse being coincident with both the first level reset pulse and the information pulses applied to the first level cores. Following this, the advance pulse is applied to the first level cores to transfer information to the second level core, after which the second level advance or read out pulse is applied to the second level core.

In this specific embodiment of the invention, any particular switching function $f$ can be obtained. If we consider the canonical form of Equation 1

$$f=f_0x'_1x'_2 \dots x'_n+f_1x'_1x'_2 \dots x_n \dots +f_{\nu-1}x_1x_2 \dots x_n$$

and assume that the second level core is a joint denial circuit, then only those terms whose coefficients $f_i=0$ would be applied to first level cores. Similarly if the second level core is an OR circuit, only those terms whose coefficients $f_i=1$ would be applied to first level cores. Thus in this specific illustrative embodiment of the invention the particular function is determined by the choice of coefficients $f_i$ represented by first level cores in the switching circuit.

It is a feature of this invention that a magnetic core have a plurality of windings to which reset, information, and advance pulses are applied, the reset pulse causing the remanent magnetization in the core to be of one polarity and the information and advance pulses causing the magnetization in the core to be of the opposite polarity so that an output pulse appears at another winding on occurrence of the advance pulse only if no information pulses have occurred.

It is another feature of this invention that a switching circuit comprise a plurality of cores each having a plurality of windings thereon to which information and control pulses are applied so that an output is generated at another winding only in the absence of any information pulses to a particular core and that the outputs of these cores be the information inputs of a single core from which an output may be obtained either in the absence of all information inputs thereto or alternatively on the presence of any one or more information inputs thereto In accordance with one aspect of this invention, the information is stored in a plurality of cores and advanced to a single core under control of reset, information, and advance pulses, as described above. It is a further feature of this invention that a reset pulse be applied to the single core coincident with the application of reset and information pulses to the plurality of cores, thereby preventing the erroneous transfer of signals between the plurality of cores and the single core.

Figure 2:
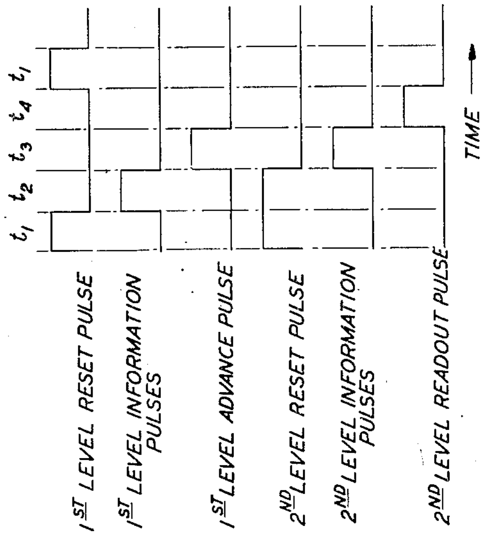

A complete understanding of this invention and of the various features thereof may be gained from consideration of the description herein and the accompanying drawing, in which:

Fig. 1 is a schematic representation, partially in block diagram form, of one specific illustrative embodiment of this invention; and Fig. 2 is a time plot of the various pulses in the embodiment of Fig. 1.

Turning now to the drawing, Fig. 1 depicts a specific illustrative embodiment of this invention that can serve as a basis both for description of a simple example and a more generalized discussion of general switching functions. As there seen two magnetic cores 10A and 10C, referred to as first level cores, and a single core 11, referred to as a second level core, are provided. Each of the first level cores 10 is provided with a first level reset winding 13, a first level advance winding 14, an output winding 15, and, in this specific embodiment, two input information windings 16. The second level core is provided with a second level reset winding 18, a second level advance winding 19, two input information windings 20, each of which is connected to the output winding 15 of one of the first level cores, and an output winding 21. The arrows beside each winding denote the direction of magnetization of the magnetic core if current is present in the given winding.

Let us for the moment consider just one core 10A to which pulses are applied in the following order: reset, input, advance. Then upon application of the advance pulse, current will or will not be present in the output winding depending on whether or not input windings 16 have been energized since the last application of a reset pulse to reset winding 13. These pulses may advantageously be derived from a reentrant counting ring circuit 24 driven by an oscillator 25 and a square wave generator 26. Advantageously the pulses may be applied from the counting ring 24 through cathode followers 28. The information pulses may be applied from some information sources $a$ and $b$, numbered 30, through an AND circuit 31 so that they are gated by the counting ring 24, and cathode followers 33.

At time $t_1$, in Fig. 2, the reset pulse is applied to the reset winding 13 on core 10 and the core will be magnetized in the clockwise direction, as indicated by the arrow adjacent winding 13. At time $t_2$ information is to be put into the core, by application of information pulses from sources 30 to windings 16 if a "1" is to be read into the core. Let us assume that at this time information source $a$ provides an output $x'$, information source $b$ an output $y'$ and $x'=y'=0$. As no information pulse is applied to windings 16, the state of the core is unchanged by the input. At time $t_3$ the advance pulse is applied to advance winding 14 and in accordance with an aspect of this invention reverses the core from a clockwise to a counterclockwise state of magnetization, causing a large change of flux which energizes the output winding 15. Thus in this case $f=1$. If an input $x$, $y$, or both had been applied by the sources 30 to windings 16, the input information would have caused the core to be magnetized in a counterclockwise direction at time $t_2$. The advance pulse would then tend to magnetize the core in the same direction it is already in, which does not cause an appreciable change of flux in the core. In these cases $f=0$.

Expressed analytically the relationship between the output $f$ at winding 15 and the inputs $x$ and $y$ from information sources $a$ and $b$ is $$f=x'y' \tag{11}$$

which is the specific example of a joint denial circuit given by Equation 10.

It is of course understood that a joint denial circuit in accordance with an aspect of this invention is not limited to any particular number of input information windings, two windings 16 being utilized in the described embodiment merely for purposes of illustration. The general expression for a magnetic core 10 with $n$ input windings and reset and advance windings, in accordance with this invention, is:

$$f(x_1,x_2, \ldots x_n)x'_1x'_2 \ldots x'_n \tag{12}$$

In order that a magnetic core switching circuit be able to produce any switching function of $n$ variables, it should be able to form any particular function of the general types given by Equations 1, 7 and 8. A single core, however, will only produce a function of the type given by Equation 12. It is, therefore, another aspect of this invention that the outputs of a number of first level magnetic cores 10 be employed as inputs to a second level core. If the second level core is a joint denial circuit, the function is defined by Equation 8 or 9; if the second level core is an OR circuit, the function is defined by Equation 1 or 7.

Turning again to Fig. 1, let us return to our simple illustration of a binary adder, the general switching function of which is given by Equation 2 and let us consider that the second level core 11 is a joint denial circuit of the type just described with respect to a first level core 10. As core 11 is a joint denial circuit, the inputs to information windings 20 should be the information to be denied to produce the desired function $f$ at the output winding 21. As indicated above with respect to Equation 2 $f_0=f_3=0$ and $f_1=f_2=1$. Information sources $a$ and $b$ can therefore supply information pulses corresponding to $x'$ and $y'$ to core 10A and information sources $c$ and $d$ can supply information pulses corresponding to $x$ and $y$ to core 10C. The output of core 10A will therefore be $xy$ and the output of core 10C will be $x'y'$. If either $xy$ or $x'y'$ is applied to core 11, no output will appear at winding 21. Therefore, an output will only appear if the condition of the information pulses is as defined by $f_1=f_2=1$, as desired for this particular switching function.

The second level core 11 may be either a joint denial circuit, as discussed above, or an OR circuit. If it is a joint denial circuit the direction of magnetization due to a read-out or advance pulse is as indicated by arrow 35, opposite to the direction of magnetization produced by a reset pulse. If it is an OR circuit the direction of magnetization due to a read-out or advance pulse is as indicated by arrow 36, in the same direction as the magnetization produced by a reset pulse. In the latter case the functions $x'y$ and $xy'$ should be applied as inputs to the second level core 11. Information sources $a$ and $b$ will therefore supply pulses corresponding to states $x$ and $y'$, and information sources $c$ and $d$ to states corresponding to $x'$ and $y$, as in this specific illustration, the denial of $x$ and $y'$ defines the switching function $x'y$ and the denial of $x'$ and $y$ the function $xy'$.

While a specific simple embodiment has been described, in relation to one particular type of circuit, namely a binary adder with two input variables, it is to be understood that the switching circuit depicted in Fig. 1 is perfectly general and may include $k$ first level cores each with $n$ inputs. If the second level core is a joint denial circuit, the switching function of the general circuit may be defined as $$f=(1-x'_{11}x'_{12} \ldots x'_{1n_1})(1-x'_{21}x'_{22} \ldots x'_{2n_2}) \ldots (1-x'_{k1}x'_{k2} \ldots x'_{kn_k}) \tag{13}$$

where $k$ and $n_1, n_2 \ldots n_k$ are any positive integers and the first subscript of the input variable denotes the core it is applied to and the second subscript the number of that input variable applied to that core. No coefficients $f_i$ are included in Equation 13 as they are determined by the presence of the first level core so that $f_i=1$ for all terms of Equation 13. Equation 13 is the expression for a general two-level circuit of the embodiment depicted in Fig. 1 and is of the type of the canonical form of Equation 8. Equation 13 differs from the canonical form of Equation 8 in that Equation 13 may be a simplified form obtained by algebraic manipulation or other methods for a specific embodiment. Thus a given input variable may occur in only one term of Equation 13, though generally many or most will appear in several terms of the equation.

If the second level core is an OR circuit, the switching function may be defined as $$f=1-(1-x'_{11}x'_{12}\ldots x'_{1n_1})(1-x'_{21}x'_{22}\ldots x'_{2n_2})\ldots(1-x'_{k1}x'_{k2}\ldots x'_{kn_k}) \quad (14)$$

where, as for Equation 13 $k$, and $n_1, n_2 \ldots, n_k$ are any positive integers and the first subscript of the input variable denotes the core it is applied to and the second subscript the number of that input variable applied to that core. Again no coefficients $f_i$ are included in Equation 14, as they are determined by the presence of the first level core in the circuit and in fact $f_i=1$ for each term of Equation 14. This is of the form of the canonical expression of Equation 7.

In certain circuits as noted above, it is desirable to apply both a pulse and its inverse to different cores simultaneously. This may be readily attained by employing a magnetic core as a joint denial circuit having but a single information input winding thereon. Thus the inverse of the variable will always be obtained from the core.

Turning now again to Fig. 1, the second level core 11 must be magnetized by the reset pulse in a clockwise direction before the first level advance pulse causes the output pulses to be read from the first level cores and applied to the input information windings 20 of the second level core 11. If the second level core were reset before information was read into the first level cores, the reading in of information would upset the reset state of the second level core as an output pulse would appear at windings 15 due to the change of flux in the first level core 10 when an input variable "1" was applied to windings 16. However, if the reset pulse is applied to the second level core after the input variables have been applied to information windings 16, then the reset pulse would cause an erroneous signal to be applied back through winding 15 to the first level cores. This problem may be resolved in a number of ways. In one specific embodiment of this invention, a rectifier network, similar to that employed in magnetic core delay lines, may be introduced between windings 15 and 20; this, however, considerably increases the overall expense of the switching circuit. Compensating windings, whether on the same cores or on corrective cores, may be utilized in embodiments of this invention; this requires uniformity in characteristics of the magnetic materials. In another embodiment of this invention there is employed a gating resistor in series with the output winding, the input information pulses being also applied across this resistor and the polarity of the output winding being chosen so that the reset pulse appears positively across it while the information pulse appears negatively. Whenever a positive input pulse is applied to an information winding, the voltage drop across the resistor is sufficient to prevent a negative pulse from appearing on the output. With resistance gating, an amplifier is advantageously placed in the output circuit to facilitate transfer from the output of one first level core into the input of a second level core.

In accordance with another aspect of this invention and in a preferred embodiment thereof extraneous pulses which appear at the output windings 15 of the first level cores 10 during the application of reset or information pulses to the first level cores are prevented from altering the state of the second level core by a particular timing of the pulses applied to the second level core 11. As seen in Fig. 2, a second level reset pulse is applied to the reset winding 18 during the periods $t_1$ and $t_2$ while the reset and input pulses are being applied to the first level cores. This second level reset pulse may be obtained from an OR circuit 35 whose inputs are the two stages of the counting ring 24 defining the periods $t_1$ and $t_2$. At the end of the second level reset pulse, the first level advance pulses are applied, transferring the information in the first level cores to the second level cores. Then, in time $t_4$, the second level readout winding is energized to produce the final output.

The extraneous pulse produced in the output winding 15 of the first level core due to application of the reset pulse to winding 13 is of a sense to aid the second level reset pulse applied to winding 18, and similarly the second level reset pulse produces an extraneous pulse at winding 20 which, when transferred back to the first level core, aids the first level reset pulse. Therefore, we need not be concerned with erroneous transfer of information between the two cores at this instant in the switching cycle. At the time that an information input pulse is applied to a winding 16 of a first level core, the flux in the second level core will already have reached a steady state condition and thus, at this time, no voltage will be generated in winding 20 and, therefore, no pulse is transferred back to the first level core. The continuing presence of the second level reset pulse, in effect, produces a bias on the hysteresis loop of the second level core such that the summation of the effects of the extraneous pulses due to information pulses being applied to the first level cores is insufficient to overcome this bias and erroneously to reverse the magnetization of the second level core. The second level reset pulse maintains the magnetization of the second level core at or past saturation and the extraneous pulses serve only to reduce this magnetic field intensity. Therefore, the second level reset pulse produces a magnetic field intensity, and thus a bias, of such a magnitude that the cumulative effect of the extraneous pulses from all first level cores is insufficient to reverse the magnetic field intensity to the point on the hysteresis loop where the magnetization of the core would be reversed. This may be attained in other embodiments of this invention wherein a large number of first level cores are employed by utilizing a second level reset pulse of larger amplitude than the information input pulses.

Advantageously, a resistance 41 is included in the closed loop defined by windings 15 and 20 to assure reversal of the magnetization of a first level core 10 on application of an information input pulse to winding 16 during the presence of the second level reset pulse.

While two levels of magnetic cores have been depicted in Fig. 1, as they can themselves attain all switching functions in accordance with aspects of this invention, there may be instances of circuits where it is desirable that the output function of the second level core be itself an input variable to another first level core. In such instances these circuits may be cascaded with no intermediate circuits needed to gate the pulses. If the second level core is an OR circuit the pulses appearing at the output winding will comprise two pulses of one polarity corresponding to the reset pulse and the information pulses read or advance from the first level cores and an output pulse of the opposite polarity which is the function to be applied as an information pulse to a third level core. Thus if the output of a number of second level cores are connected to the input of another core, the extraneous output pulses which occur act as additional resets and thus need not be blocked by diodes or gating circuits.

It is to be understood that the above-described arrangements are illustrative of the application of the principles of the invention. Numerous other arrangements may be devised by those skilled in the art without departing from the spirit and scope of the invention.

What is claimed is:

1. In a switching circuit, at least two first level magnetic cores each having a plurality of windings thereon, means for applying reset pulses to one winding of each of said first level cores to cause the remanent magnetization in said cores to be of one polarity, means for applying information pulses individually to certain of said windings of said first level cores to reverse the remanent magnetization in any of said cores to which at least one information pulse is applied, a second level magnetic core having a plurality of windings thereon, means for applying a reset pulse to one of said windings of said second level core to determine the remanent magnetization in said second level core to be of one polarity, means for applying an advance pulse to another of said windings on each of said first level cores to reverse the magnetization in those of said first level cores to which no information pulses were applied, means for applying pulses to windings on said second level core to reverse the magnetization in said second level core on reversal of the magnetization in a first level core by said advance pulses, and means for applying a read out pulse to said second level core.

2. In a switching circuit in accordance with claim 1 wherein one of said windings on said second level core is an output winding, said means for applying a read out pulse to said second level core comprising means for applying a pulse to said second level core to reverse the polarity of the remanent magnetization in said second level core only if the remanent magnetizations in said first level cores had not been reversed by said advance pulses.

3. In a switching circuit in accordance with claim 1 wherein one of said windings on said second level core is an output winding, said means for applying a read out pulse to said second level core comprising means for applying a pulse to said second level core to reverse the remanent magnetization of said second level core only if the remanent magnetization in at least one of said first level cores had been reversed by said advance pulses.

4. In a switching circuit in accordance with claim 1, said means for applying a reset pulse to one of said windings on said second level core comprising means for applying said reset pulse during the application of said reset and information pulses to said first level cores.

5. In a switching circuit, at least two first level magnetic cores each having a plurality of windings thereon, means for applying a single reset pulse through a winding on each of said first level cores for determining the remanent magnetizations in said cores, means for applying information pulses individually to certain of said windings on said cores to reverse the magnetization in said cores, means for applying a single advance pulse through a winding on each of said cores capable of determining the magnetizations in said cores in the opposite polarities to that determined by said reset pulse, a second level magnetic core having a plurality of windings thereon, means for applying a reset pulse to a winding on said second level core coincident in time with said reset and information pulses applied to said first level cores and determining the remanent magnetization in said second level core in one polarity, means for transferring information stored in said first level cores to said second level core on application of said single advance pulse to said first level cores, said transferring means including a winding on each of said first level cores connected to individual windings on said second level core, and means for applying a read out pulse to another of said windings on said second level core after said single advance pulse has been applied to said first level cores whereby an output pulse is received on another of said windings on said second level core if a particular information function has been transferred to said level core.

6. In a switching circuit in accordance with claim 5, said means for applying a read out pulse to said second level core comprising means for applying a pulse to said second level core to reverse the polarity of the remanent magnetization in said second level core only if the remanent magnetization in none of said first level cores had been reversed by said single advance pulse.

7. In a switching circuit in accordance with claim 5, said means for applying a read out pulse to said second level core comprising means for applying a pulse to said second level core to reverse the remanent magnetization of said second level core only if the remanent magnetization in at least one of said first level cores had been reversed by said single advance pulse.

8. A switching circuit for producing an output for any particular function $f$ defined by the expression $$f=f_0x'_1x'_2 \ldots x'_n+f_1x'_1x'_2 \ldots x_n \ldots +f_{2^n-1}x_1x_2 \ldots x_n$$

where $x_1, x_2 \ldots x_n$ are binary variables and $f_0, f_1 \ldots f_{2^n-1}$ are coefficients having the value zero or one and $n$ is any positive integer comprising a magnetic core having a plurality of windings thereon, means for applying a reset pulse to one of said windings to cause the remanent magnetization in said core to be of one polarity, means including a plurality of other magnetic cores for applying information pulses individually to certain of said windings to reverse the magnetization in said core on the occurrence of at least one of said information pulses, said information pulses representing components of said expression, means for applying a read out pulse to another of said windings to reverse the magnetization in said core if no information pulses have occurred, and means including another of said windings for transmitting an output pulse on occurrence of said advance pulse if no information pulses had occurred.

9. A switching circuit in accordance with claim 8 wherein said means for applying information to certain of said windings representing components of said expression comprises means for reading out of each of said other magnetic cores one of said terms of said expression.

10. In a switching circuit, at least two magnetic cores each having a plurality of windings thereon, means for applying reset pulses through a winding on each of said cores to determine the remanent magnetization in said cores in one direction, means for applying information pulses individually to certain of said windings on said cores to reverse the magnetization in said cores, means applying an advance pulse through another winding on each of said cores capable of determining the magentization in said cores in the opposite directions to those determined by said reset pulse, an output winding on each of said cores, another core having a plurality of windings thereon, each of said output windings being connected to one of said windings on said another core, whereby first switching functions stored in said first-mentioned cores are transferred to said another core by said advance pulses, means for reading out an ultimate switching function from said another core dependent on said first switching functions, and means for preventing transfer of information between said first-mentioned cores and said another core other than during said advance pulse.

11. In a switching circuit in accordance with claim 10, said means for preventing transfer of information comprising means applying a reset pulse to said another core to determine its remanent magnetization in one direction during the application of said reset and information pulses to said first-mentioned cores.

12. In a switching circuit, at least two magnetic cores each having a plurality of windings thereon, means for applying a single reset pulse through a winding on each of said cores for determining the remanent magnetization in said cores in one polarity, means for applying information pulses individually to certain other of said windings on said cores to reverse the magnetization in said cores, means for applying a single advance pulse through a winding on each of said cores capable of determining the magnetization in the opposite polarity to that determined by said reset pulse, an output winding on each of said cores, another core having a plurality of windings thereon, each of said output windings being connected to one of said windings on said another core, means for applying a reset pulse to a winding on said another core, said reset pulse being coincident with said reset and information pulses applied to said windings on said first-mentioned cores and determining the remanent magnetization in said another core in one polarity, and means for applying a read out pulse to another of said windings on said another core after said first-mentioned advance pulses have been applied to said windings on said first-mentioned cores, whereby the switching function stored in said first-mentioned cores is transferred to said another core and an output pulse received on another of said windings on said another core if a particular function has been transferred.

References Cited in the file of this patent

UNITED STATES PATENTS

| | | |
|---|---|---|
| 2,654,080 | Browne | Sept. 29, 1953 |
| 2,729,808 | Auerbach et al. | Jan. 3, 1956 |

OTHER REFERENCES

Publication I, RCA Review, June 1952, pp. 187–192.

Publication II, Proc. Ass. for Comp. Mach., May 1952 pp. 223–229.